July 31, 1956    J. HURÉ ET AL    2,757,081
METHOD FOR SEPARATING AND PURIFYING ZIRCONIUM AND HAFNIUM
Filed March 14, 1955
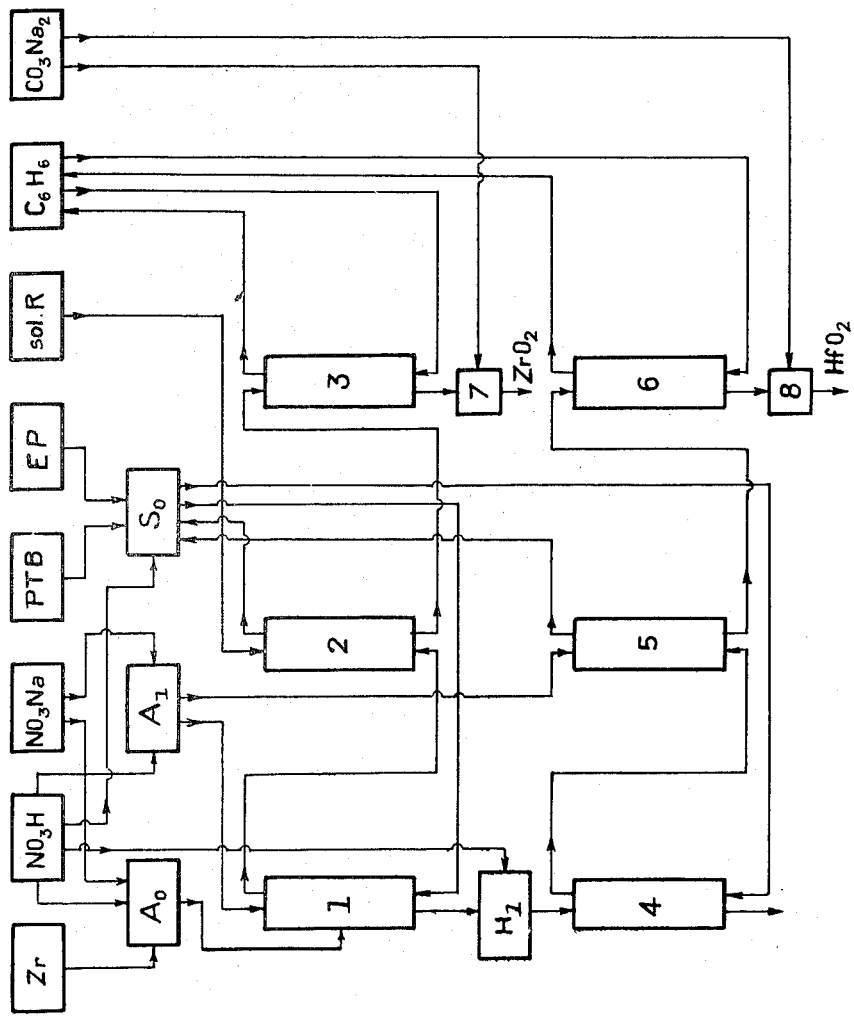

United States Patent Office 2,757,081
Patented July 31, 1956

2,757,081
METHOD FOR SEPARATING AND PURIFYING ZIRCONIUM AND HAFNIUM

Jacques Huré, Fontenay-aux-Roses, and Rose Saint-James, Clamart, France, assignors to Commissariat a l'Energie Atomique, Paris, France, a State administration of France Application March 14, 1955, Serial No. 493,942

Claims priority, application France March 17, 1954

22 Claims. (Cl. 75—121)

The present invention relates to methods for separating zirconium from hafnium and purifying these two elements.

Its chief object is to provide a method of this kind which makes it possible to obtain with a high yield, zirconium and/or hafnium having a high degree of purity.

For this purpose, according to our invention, starting from an ore or a complex substance containing zirconium and hafnium, our method comprises the steps of forming from said substance an aqueous and acid solid solution of zirconium and hafnium of preferably a concentration lower than 0.2 N (N designating normal solution concentration), placing said solution in contact with a solvent, either acidified or not, consisting essentially of an alkyl phosphate or acetate or analogous body, whereby said solvent extracts zirconium from the aqueous solution whereas hafnium remains therein, and removing zirconium and hafnium from said solvent and said solution respectively after they have thus been placed in contact with each other.

The method of extraction by a solvent has not yet been used for separating in large quantities elements which are very close to each other such as zirconium and hafnium, this separation being generally obtained by fractionated precipitation and crystallization, that is to say operations which are long and delicate and give a low yield.

It has also been proposed to separate these elements from each other by an exchange of ions or by chromatography on a silica gel. It is thus possible to obtain products having a satisfactory purity but the field of application of these methods is limited on the one hand by their low yield and on the other hand by the small capacity of production in view of the fact that the operations are effected with diluted solutions or under very strict dryness conditions for a part of the treatment, the remainder thereof taking place in aqueous solution. It has also been proposed to prepare the above mentioned elements by making use of thenoyltrifluor acetone dissolved in benzene or similar organic solvents, but these reagents cannot be recovered and their cost is too high to permit of using them for practical purposes, that is to say otherwise than for analysis.

According to the present invention, we prepare an aqueous and acid solution, for instance a nitric solution, of the substance (ore or other compound) which contains zirconium, hafnium and various impurities. The concentration of zirconium and hafnium in this aqueous and acid solution is lower than that corresponding to a molecular proportion of 0.2. The acid may be for instance nitric acid used with a concentration ranging from 1.5 to 3.5 N, for instance 2.5 N. On the other hand, we make use of a solvent constituted by an alkyl phosphate or acetate or the like, such as mono-, di- or tri-butyl phosphate, tri-octyl phosphate, butyl phenyl phosphate, butyl acetate or iso-amyl acetate, and the two phases constituted respectively by the above mentioned aqueous and acid solution and by the solvent are placed in contact with each other, preferably in counter-current fashion, in a solvent extraction column. Extraction may also be performed by placing the phases in contact in equicurrent fashion and with or without reflux. The solvent which constitutes the second of the two above mentioned phases may be used either alone or mixed or diluted with other solvents, such as petroleum ether, which have no action on zirconium or hafnium, and we may make use of either only one or several such solvents mixed together.

The aqueous and acid solution used in a suitable form and with a proper concentration may include a mineral or organic salt, such as an alkaline nitrate, which serves to improve extraction (anion and cation) or separation of zirconium and hafnium by producing the "salt effect." This alkaline nitrate, such for instance as sodium nitrate, is used with a molarity of from 2 to 5 M, for instance 3.5 M.

According to the nature and the concentration of the mineral or organic acid that is used, and the concentration or nature of the salt which serves to facilitate extraction, it is possible either to extract hafnium and zirconium simultaneously with the exclusion of other cations, or to extract either of these two elements (hafnium and zirconium) preferentially.

It is possible to recuperate the zirconium and/or hafnium dissolved in the solvent by washing with a suitable aqueous solution, either acid or not, which may contain a complexing element such as oxalic acid or an oxalate, acetic acid or an acetate, hydrofluoric acid or a fluoride. This aqueous solution may also contain a precipitating body such as ammonia or an alkaline carbonate. In order to avoid the formation of emulsions, we may dissolve in the aqueous phase some bodies, such as octyl alcohol, having tensio-active properties.

In the above indicated treatment, zirconium and hafnium, after extraction of the solvent, are freed from some cations such as iron, titanium, niobium, tantalum and rare earths with the exclusion of traces of cerium if this body is present with valency 4.

The traces of solvent or solvents which might remain in the aqueous solution may be eliminated by washing this solution with a solvent, in particular a chlorine containing solvent such as carbon tetrachloride, which is practically insoluble in water, whereas the above mentioned solvents are very much soluble therein.

When the solvent used to form the second of the above mentioned phases is an alkyl phosphate, for instance butyl phosphate, which is slightly miscible with water, it is of advantage to wash the aqueous phase from which it is to be recovered by a solvent which is little soluble in water, such as carbon tetrachloride or benzene which, by extracting the alkyl phosphate, prevents precipitation in the course of subsequent operations, of zirconium or hafnium phosphate.

The method according to our invention can be applied within a wide range of concentrations of zirconium. However, in view of the facility with which this element forms polymeric ions or colloidal solutions, some precautions are necessary when forming the aqueous and acid solution, especially concerning the concentration of the acid when it is attacked. Furthermore, this placing in solution is preferably effected at a temperature close to 80° C.

The annexed drawing shows, by way of example, a flow-sheet for carrying out the invention in order to obtain zirconium containing $10^{-4}$ hafnium and hafnium containing about 10% of zirconium.

On this drawing, $A_0$ designates a mixing tank fed with zirconium in such manner that the concentration of zirconium is about 10 gr. per liter, with nitric acid so that the concentration of $NO_3H$ corresponds substantially to 2.5 N, and with sodium nitrate in such manner that the $NO_3Na$ concentration is about 3.5 M (molarity). At the outlet of this mixing tank $A_0$, we obtain an aqueous and nitric solution containing zirconium, hafnium and various impurities.

$A_1$ designates a second mixing tank fed with nitric acid coming from the same source ($NO_3H$) and having the above mentioned concentration of about 2.5 N and with sodium nitrate coming also from the same source ($NO_3Na$) and having the same concentration (about 3.5 M) as that in tank $A_0$. At the outlet of tank $A_1$ we therefore obtain a nitric solution of sodium nitrate.

$S_0$ designates a mixing and decanting tank fed with a solvent such as tributyl phosphate (PTB) which may be diluted by half with petroleum ether (E. P.) and which is suitably acidified by means of nitric acid coming from the source $NO_3H$ which is connected with tanks $A_0$ and $A_1$. At the outlet of this decanting and mixing tank $S_0$, we therefore obtain a solvent acidified with $NO_3H$, of a concentration of about 1.5 N. The decanted nitric acid obtained in this apparatus $S_0$ may be mixed with concentrated $NO_3H$ in suitable proportions and fed back to the $NO_3H$ source in order to serve to further acidifications of the solvents.

1 designates a solvent extraction column with six theoretical plates, this column being fed with the liquids supplied by the mixing tanks $A_0$ and $A_1$ which are admitted respectively to the middle part and to the top of column 1. This column is further fed with acidified solvent coming from the mixing and decanting tank $S_0$, this solvent being fed to the bottom of column 1 so that it flows in counter-current to the liquids coming from $A_0$ and $A_1$, at the rate of 150 volumes of solvent for 100 volumes of aqueous phase supplied from $A_0$ and 100 volumes of aqueous phase supplied from $A_1$. In the lower half of column 1, the zirconium contained in solution $A_0$ is extracted by the solvent coming from $S_0$. In the upper half of the same column, the solvent coming from the lower part of said column, where it has extracted zirconium, is purified by the solution supplied from $A_1$. We thus constitute a double coumn which improves the total efficiency of the operation.

2 designates an extraction column with two theoretical plates. The purified zirconium contained in the solvent issuing from column 1 is recovered by washing with an aqueous solution of a body forming a complex with Zr, for instance ammonium acetate M/3 coming from source Sol. R. The solvent may be recycled to $S_0$ where the relative proportions of the solvents are adjusted to their initial values.

3 designates a solvent extraction column or a mixing and decanting tank in which the purified zirconium aqueous solution is freed from the last traces of solvent by washing with benzene ($C_6H_6$) or carbon tetrachloride.

$H_1$ designates a mixing tank where the aqueous solution coming from column 1 and containing practically all the hafnium is acidified by means of nitric acid. The final acidity is to range from 5 to 7 N.

4 designates a solvent extraction column with three theoretical plates which collects the Hf containing acidified aqueous solution coming from $H_1$. In this column 4, zirconium and hafnium are extracted by solvent coming from $S_0$. The residual aqueous phase is thrown out.

5 designates a solvent extraction column with five theoretical plates. Hafnium, contained in the solvent, is recovered preferentially by washing with the nitric solution supplied from mixing tank $A_1$. The solvent which contains a small amount of zirconium may be recycled into the mixing and decanting tank $S_0$.

6 designates a mixing and decanting tank in which the aqueous solution of hafnium is freed from the last traces of solvent it may contain by washing with benzene or carbon tetrachloride coming from the source $C_6H_6$. Either of these two solvents may be used for several operations before being distilled for purification.

7 designates a precipitation tank with thickening means after which is provided a filter-press, this tank receiving the purified zirconium aqueous solution from extraction column 3 and also a solution of $CO_3Na_2$ for instance. At the outlet of this tank 7 we obtain, when the plant is working steadily, zirconia $ZrO_2$ free from hafnium.

An analogous tank 8 in which the aqueous and purified solution supplied from the mixing and decanting tank 6 is precipitated, with a solution of $CO_3Na_2$ for instance, supplies an aqueous solution of hafnium oxide $HfO_2$ containing only about 10% of zirconium.

What we claim is:

1. The method of treating a substance containing zirconium and hafnium which comprises forming from said substance an aqueous and acid solution of zirconium and hafnium, placing said solution in contact with a solvent consisting at least chiefly of a compound of the group constituted by alkyl phosphates and acetates, whereby said solvent extracts zirconium from said aqueous solution, whereas hafnium remains therein, and removing zirconium and hafnium from said solvent and said solution respectively after they have been thus placed in contact with each other.

2. The method of treating a substance containing zirconium and halfnium which comprises forming from said substance an aqueous and acid solution of zirconium and halfnium of a concentration lower than 0.2 N, placing said solution in contact with a solvent consisting at least chiefly of a compound of the group constituted by alkyl phosphates and acetates, whereby said solvent extracts zirconium from said aqueous solution, whereas hafnium remains therein, and removing zirconium and hafnium from said solvent and said solution respectively after they have been thus placed in contact with each other.

3. A method according to claim 1 in which the aqueous and acid solution is a nitric acid solution.

4. A method according to claim 2 in which the aqueous and acid solution is a nitric acid solution.

5. A method according to claim 2 in which the nitric acid concentration ranges from 1.5 to 3.5 N.

6. A method according to claim 1 in which the solvent consists chiefly of butyl phosphate.

7. A method according to claim 1 in which the solvent consists chiefly of tri-octyl phosphate.

8. A method according to claim 1 in which the solvent consists chiefly of butyl-phenyl phosphate.

9. A method according to claim 1 in which the solvent consists chiefly of butyl acetate.

10. A method according to claim 1 in which the solvent consists chiefly of iso-amyl acetate.

11. A method according to claim 1 in which the aqueous and acid solution and the solvent are placed in contact by flowing in counter-current fashion.

12. A method according to claim 1 in which the aqueous and acid solution and the solvent are placed in contact by flowing in equi-current fashion.

13. A method according to claim 1 in which the aqueous and acid solution and the solvent are placed in countercurrent contact with reflux.

14. A method according to claim 1 in which the solvent is mixed with a second solvent such as petroleum ether, having no action on zirconium and hafnium.

15. A method according to claim 1 in which the aqueous and acid solution contains a body for facilitating extraction and consisting of a salt.

16. A method according to claim 1 in which the aqueous and acid solution contains a compound for facilitating extraction and consisting of an alkaline nitrate used with a molarity ranging from 2 to 5 M, for instance 3.5 M.

17. A method according to claim 1 in which zirconium and hafnium are recovered from the solvent by washing with an aqueous solution.

18. A method according to claim 16 in which the washing aqueous solution contains a precipitating body such as ammonia or an alkaline carbonate.

19. A method according to claim 1 in which the aqueous and acid solution contains a surface-active compound such as octyl alcohol.

20. A method according to claim 3 in which the aqueous and acid solution is washed with a solvent which is little soluble in water, such as carbon tetrachloride.

21. A method according to claim 1, further characterized in that, when the solvent consists of an alkyl phosphate, the recovery aqueous phase is washed with a solvent which is little soluble in water.

22. A method according to claim 1 in which the aqueous and acid solution is prepared at a temperature close to 80° C.

References Cited in the file of this patent

"Zirconium" (Miller), published by Academic Press, Inc. (New York), 1954, page 41.